(12) United States Patent
Chen et al.

(10) Patent No.: US 10,818,247 B2
(45) Date of Patent: Oct. 27, 2020

(54) DISPLAY METHOD AND DEVICE FOR REDUCING MOTION BLUR

(71) Applicant: Qisda Corporation, Taoyuan (TW)

(72) Inventors: Min-Jye Chen, Taoyuan (TW);
Chien-Szu Chiu, Taoyuan (TW);
Chung-Ting Yen, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/687,603

(22) Filed: Nov. 18, 2019

(65) Prior Publication Data

US 2020/0090597 A1    Mar. 19, 2020

Related U.S. Application Data

(62) Division of application No. 15/682,653, filed on Aug. 22, 2017, now Pat. No. 10,559,267.

(30) Foreign Application Priority Data

Sep. 26, 2016  (CN) .......................... 2016 1 0850852

(51) Int. Cl.
*G09G 3/34* (2006.01)
*G02F 1/133* (2006.01)
(Continued)

(52) U.S. Cl.
CPC ....... *G09G 3/3406* (2013.01); *G02F 1/13306* (2013.01); *G09G 3/3413* (2013.01);
(Continued)

(58) Field of Classification Search
CPC .............. G02F 1/13306; G02F 1/1336; G09G 2310/0237; G09G 2320/0626;
(Continued)

(56) References Cited

U.S. PATENT DOCUMENTS 5,731,794 A     3/1998  Miyazawa
2003/0179221 A1*  9/2003  Nitta ................... G09G 3/3406
                                                        345/690
(Continued)

FOREIGN PATENT DOCUMENTS

CN      101315748 B    12/2008
TW      201435849 A    9/2014
TW      201506892 A    2/2015

OTHER PUBLICATIONS

Counterpart office action of Taiwan IP Office on Jun. 6, 2017.
Office action of counterpart application by SIPO on Jun. 4, 2018.

*Primary Examiner* — Dmitriy Bolotin

(57) ABSTRACT

A display method for reducing motion blur in a video is provided. The display method includes the following steps. Receive a video signal including multiple frames. Display the multiple frames sequentially in multiple frame intervals on a display panel, wherein each frame interval includes a vertical blanking interval and a data scan interval. Provide a backlight enable signal in each frame interval to control turning on and turning off of a backlight unit for the display panel. The backlight enable signal includes a first enable pulse and a blanking enable pulse. The first enable pulse is in the data scan interval. The blanking enable pulse is in the vertical blanking interval. The backlight unit is turned on during the first enable pulse and the blanking enable pulse.

20 Claims, 8 Drawing Sheets

(51) Int. Cl.
  *G09G 5/00* (2006.01)
  *G02F 1/13357* (2006.01)
  *G09G 3/20* (2006.01)
(52) U.S. Cl.
  CPC ........... *G09G 5/003* (2013.01); *G02F 1/1336* (2013.01); *G09G 3/2022* (2013.01); *G09G 2310/0237* (2013.01); *G09G 2320/0626* (2013.01); *G09G 2320/103* (2013.01)
(58) Field of Classification Search
  CPC ........... G09G 2320/103; G09G 3/2022; G09G 3/3406; G09G 3/3413; G09G 5/003
  See application file for complete search history.

(56) References Cited

U.S. PATENT DOCUMENTS

| | | |
|---|---|---|
| 2004/0027323 A1* | 2/2004 | Tanaka ................. G09G 3/3611 345/98 |
| 2007/0229447 A1 | 10/2007 | Takahara |
| 2011/0175935 A1 | 7/2011 | S |
| 2013/0314641 A1 | 11/2013 | Okuda |
| 2014/0191936 A1 | 7/2014 | Ho et al. |
| 2014/0218350 A1 | 8/2014 | Wee et al. |
| 2014/0266996 A1* | 9/2014 | Slavenburg ............ G09G 5/363 345/102 |
| 2015/0138173 A1 | 5/2015 | Bae |
| 2015/0170578 A1 | 6/2015 | Choi |

* cited by examiner

DISPLAY METHOD AND DEVICE FOR REDUCING MOTION BLUR

This application is a divisional application of co-pending application Ser. No. 15/682,653, filed on Aug. 22, 2017, which claims the benefit of People's Republic of China application Serial No. 201610850852.9, filed on Sep. 26, 2016, the subject matter of which is incorporated herein by reference.

BACKGROUND OF THE INVENTION

Field of the Invention

The invention relates in general to a display method and device, and more particularly to a display method and device for reducing motion blur.

Description of the Related Art

Liquid crystal display (LCD) is currently a common display panel. The LCD is a hold type display device. That is, for every pixel, the pixel intensity remains a constant value until being updated in the next image frame. When displaying multiple consecutive image frames, a moving object in a video remains static in one image frame due to this LCD characteristic, resulting in motion blur effect for human vision. The motion blur effect may degrade image quality and cause discomfort for the user. Therefore, how to improve the motion blur effect for the display device has become a prominent task in the industry.

SUMMARY OF THE INVENTION

According to one embodiment of the present invention, a display method for reducing motion blur is provided. The display method includes the following steps. Receive a video signal including multiple frames. Display the multiple frames sequentially in multiple frame intervals on a display panel, wherein each frame interval includes a vertical blanking interval and a data scan interval. Provide a backlight enable signal in each frame interval to control turning on and turning off of a backlight unit for the display panel. The backlight enable signal includes a first enable pulse and a blanking enable pulse. The first enable pulse is in the data scan interval. The blanking enable pulse is in the vertical blanking interval. The backlight unit is turned on during the first enable pulse and the blanking enable pulse.

According to another embodiment of the present invention, a display device for reducing motion blur is provided. The display device includes a display panel, a backlight unit, a display driving circuit, and a backlight control circuit. The display driving circuit is configured to receive a video signal. The video signal includes multiple frames. The display driving circuit is configured to drive the display panel to display the frames sequentially in multiple frame intervals. Each frame interval includes a vertical blanking interval and a data scan interval. The backlight control circuit is configured to provide a backlight enable signal in each frame interval to control turning on and turning off of the backlight unit. The backlight enable signal includes a first enable pulse and a blanking enable pulse in each frame interval. The first enable pulse is in the data scan interval, the blanking enable pulse is in the vertical blanking interval, and the backlight unit is turned on during the first enable pulse and the blanking enable pulse.

The above and other aspects of the invention will become better understood with regard to the following detailed description of the preferred but non-limiting embodiment(s). The following description is made with reference to the accompanying drawings.

DETAILED DESCRIPTION OF THE INVENTION

A liquid crystal display device may include a display panel and a backlight unit. The backlight unit includes a light source to illuminate the display panel in front of it. The light source is for example a Light-Emitting Diode (LED) or a Cold Cathode Fluorescent Lamps (CCFL). By controlling turning on and turning off of the backlight unit, such as controlling whether the backlight unit is on in a frequency higher than that a human eye can perceive, the liquid crystal pixel does not remain lit during the entire image frame, thus the motion blur effect can be mitigated.

Figure 1:
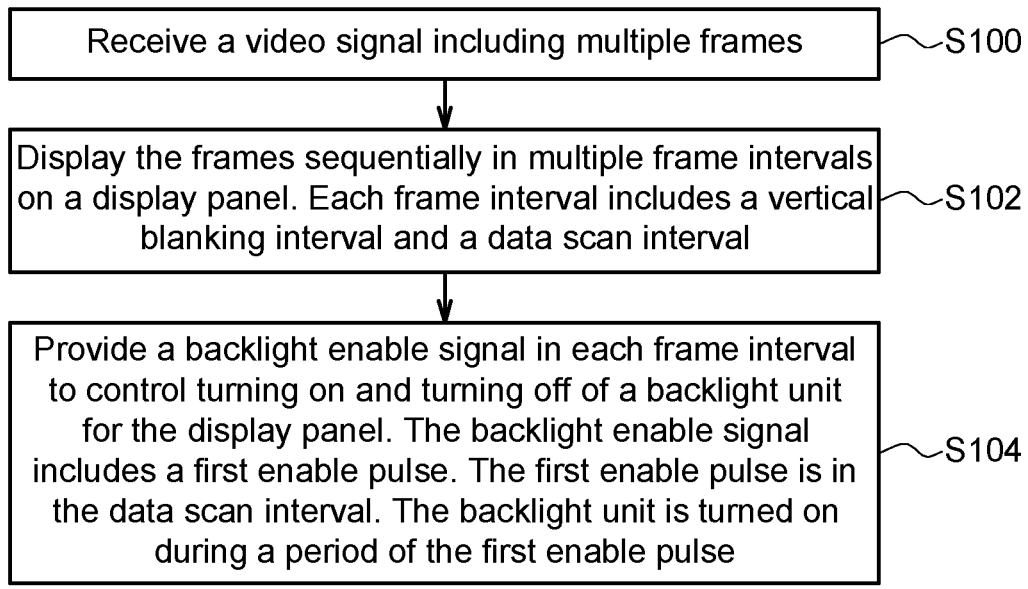
FIG. 1 shows a flowchart of a display method according to an embodiment of the present invention.
Figure 2:
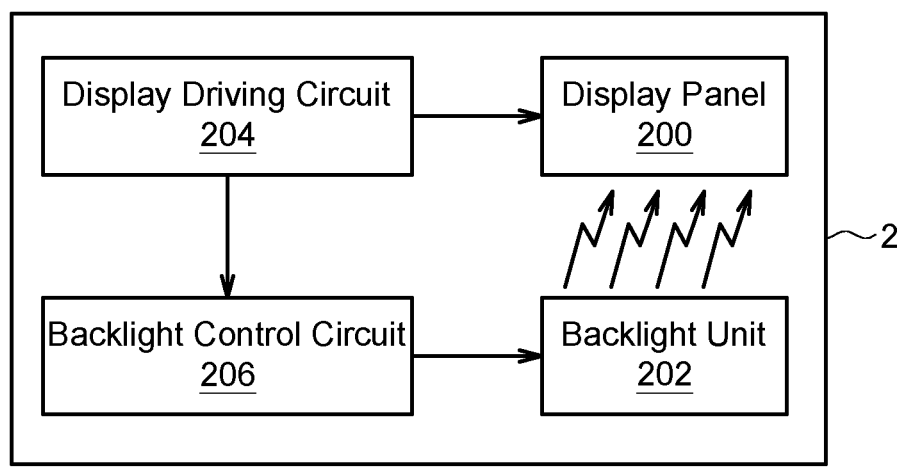
FIG. 2 shows a block diagram of a display device according to an embodiment of the present invention.

The display method and the display device in this disclosure are described in detail as follows. Please refer to FIG. 1 and FIG. 2. FIG. 1 shows a flowchart of a display method according to an embodiment of the present invention. FIG. 2 shows a block diagram of a display device according to an embodiment of the present invention. The display method for reducing motion blur as shown in FIG. 1 includes the following steps. Step S100: Receive a video signal including multiple frames. Step S102: Display the multiple frames sequentially in multiple frame intervals on a display panel. Each frame interval includes a vertical blanking interval (VBI) and a data scan interval. Step S104: Provide a backlight enable signal in each frame interval to control turning on and turning off of a backlight unit for the display panel. The backlight enable signal includes a first enable pulse. The first enable pulse is in the data scan interval. The backlight unit is turned on during the first enable pulse.

The display device 2 shown in FIG. 2 includes a display panel 200, a backlight unit 202, a display driving circuit 204, and a backlight control circuit 206. The display driving circuit 204 is configured to receive a video signal (step S100). The video signal includes multiple frames. The display driving circuit 204 is configured to drive the display panel 200 to display the frames sequentially in multiple frame intervals (step S102). Each frame interval includes a vertical blanking interval and a data scan interval. The backlight control circuit 206 is configured to provide a backlight enable signal in each frame interval to control turning on and turning off of the backlight unit 202. The backlight enable signal includes a first enable pulse in each frame interval. The first enable pulse is in the data scan interval, and the backlight unit 202 is turned on during the first enable pulse (step S104).

As shown in FIG. 2, the display driving circuit 204 is configured to drive the display panel 200 to display image data. The backlight control circuit 206 is configured to control when the backlight unit 202 is turned on, determining when the light source is on or off. In one embodiment, the backlight control circuit 206 receives control signals from the display driving circuit 204 to determine the control timing for the backlight unit 202.

Figure 3A:
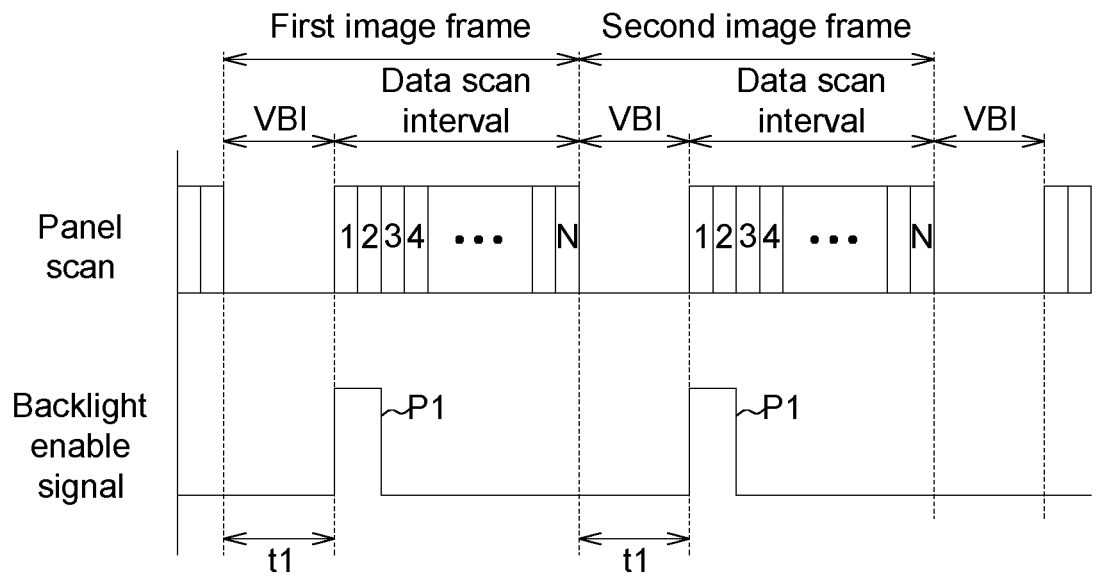
FIG. 3A shows a signal timing diagram according to an embodiment of the present invention.

The display method and the display device will be described in accompany with the timing diagrams shown in FIG. 3A and FIG. 3B. Multiple frames are sequentially displayed on the display panel 200 in multiple frame intervals. The multiple frame intervals include for example a first image frame and a second image frame shown in FIG. 3A. Each frame interval includes a vertical blanking interval (VBI) and a data scan interval. Referring to the panel scan signal timing shown in FIG. 3A, the display panel 200 does not receive driving data in the vertical blanking interval. In the data scan interval, the display driving circuit 204 sequentially provides image data row by row to the display panel 200. For the display panel 200 having N rows, the $1^{st}$ row, the $2^{nd}$ row, . . . , the $(N-1)^{th}$ row, and the $N^{th}$ row are driven sequentially.

The backlight enable signal provided by the backlight control circuit 206 includes the first enable pulse P1. The first enable pulse P1 is in the data scan interval, and the backlight unit 202 is turned on during the first enable pulse P1. In the embodiment shown in FIG. 3A, the start time of the first enable pulse P1 is the same in each frame interval. The start time of the first enable pulse P1 is for example the time of the leading edge of the first enable pulse P1. In other words, the backlight unit 202 is turned on at a fixed time instant in every frame interval. In this example, the backlight unit 202 is always turned on after the vertical blanking interval ends. In addition, the backlight control circuit 206 may be configured to adjust the time length of the first enable pulse P1. A longer first enable pulse P1 provides better display brightness under the same backlight intensity condition.

Figure 3B:
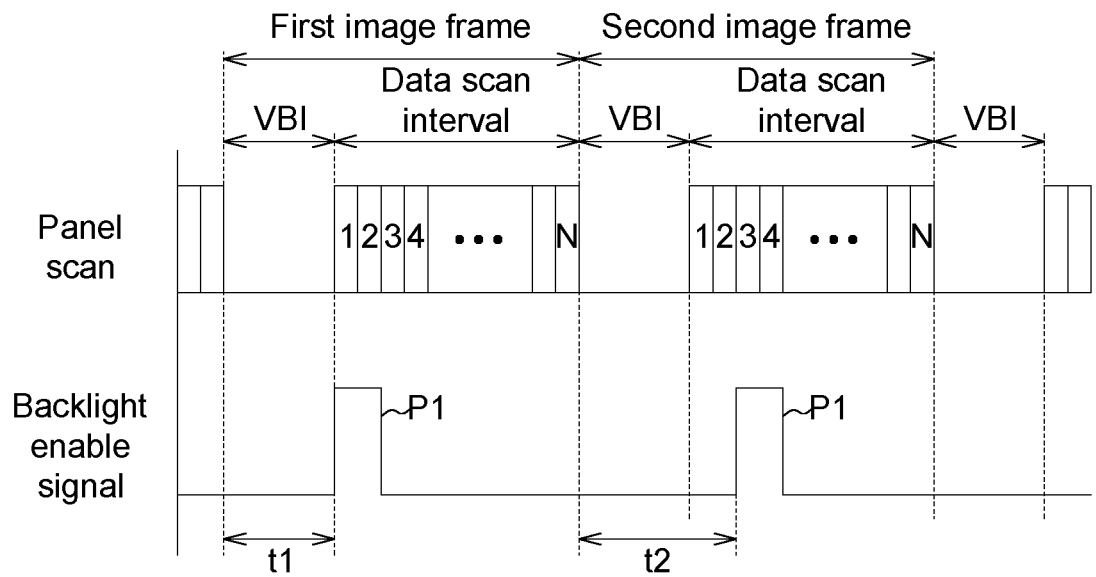
FIG. 3B shows a signal timing diagram according to an embodiment of the present invention.

FIG. 3B shows a signal timing diagram according to an embodiment of the present invention. In this embodiment, the video displayed by the display panel 200 includes multiple frames, including consecutive the first image frame and the second image frame. The time periods during which the backlight unit 202 is turned on are different in the first image frame and in the second image frame. That is, the start time of the first enable pulse P1 in the first image frame is different from the start time of the first enable pulse P1 in the second image frame.

As shown in FIG. 3B, the start time of the first enable pulse P1 in the first image frame is t1. The start time of the first enable pulse P1 in the second image frame is t2. In this example t1 is not equal to t2. In the successive first image frame and second image frame, the time periods during which the backlight unit 202 is turned on are corresponding to scan time of different rows in the display panel 200. Consequently the motion blur phenomenon is effectively dispersed to different locations in the image, thus enhancing the image quality. Similarly, the backlight control circuit 206 may also be configured to adjust the time length of the first enable pulse P1.

According to the embodiment shown in FIG. 3B, the backlight unit is turned on during the data scan interval. By changing the on time of the backlight unit in consecutive image frames, the motion blur phenomenon can be dispersed in different locations in the image, rather than being fixed at a specific location. Such approach mitigates the discomfort to human eyes and reduces motion blur effect.

The image brightness might be affected because the backlight unit does not remain on during the entire image frame interval. Because the backlight unit is turned on during the data scan interval in the present disclosure and the vertical blanking interval is relatively shorter than the data scan interval within one frame interval, the time period for turning on the backlight unit is sufficiently long, such that the image brightness can be improved. Thus there is no need for increasing the light intensity of the backlight unit. The production cost of the backlight unit can be effectively reduced.

In the driver circuit for some LCD devices, the control signal may include a vertical sync signal (Vsync). The vertical sync signal includes a vertical sync pulse in the vertical blanking interval to control timing of display driving signals. In one embodiment, the backlight enable signal may be generated according to the vertical sync pulse.

Figure 4:
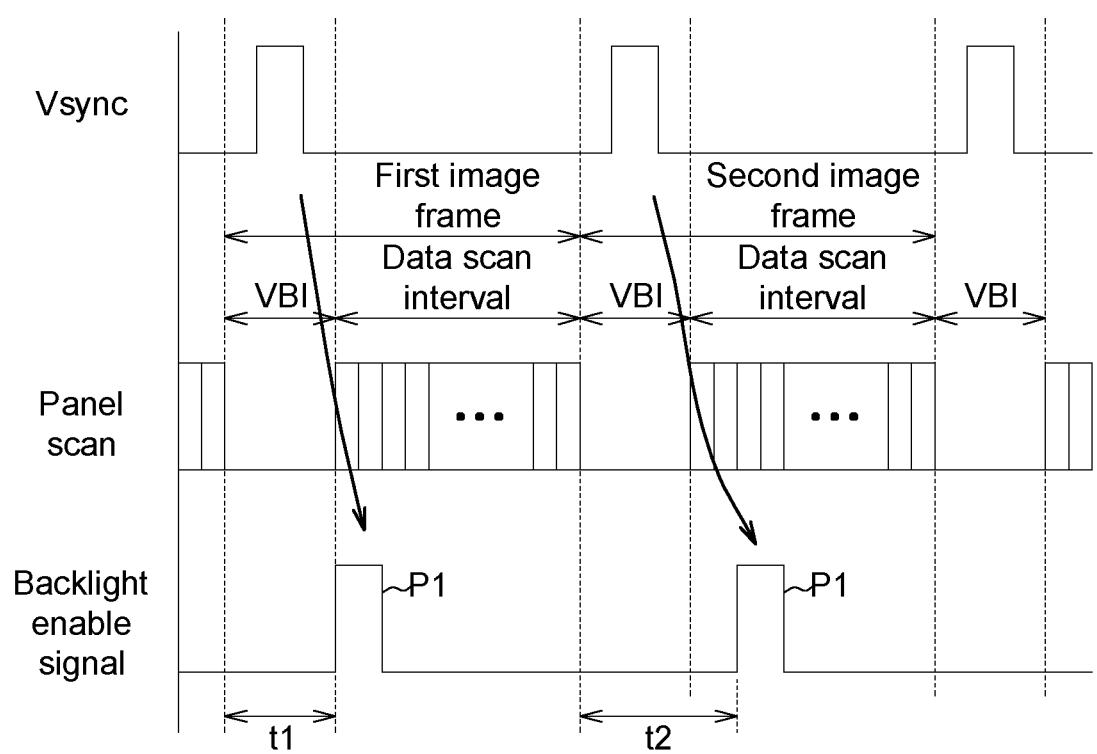
FIG. 4 shows a diagram of generating the backlight enable signal according to the vertical sync signal according to an embodiment of the present invention.

FIG. 4 shows a diagram of generating the backlight enable signal according to the vertical sync signal according to an embodiment of the present invention. The display driving circuit 204 may be configured to provide the vertical sync signal. As shown in FIG. 4, the vertical sync signal includes a vertical sync pulse in the vertical blanking interval. The backlight control circuit 206 may generate the backlight enable signal according to the vertical sync pulse. As such, the timing of the backlight enable signal is determined based on the vertical sync pulse and is relatively synchronized to the vertical blanking interval. Therefore the backlight unit 202 can be controlled to be turned on during the data scan interval. Moreover, the backlight unit 202 can be controlled to be turned on at different time instants in consecutive image frames.

Figure 5:
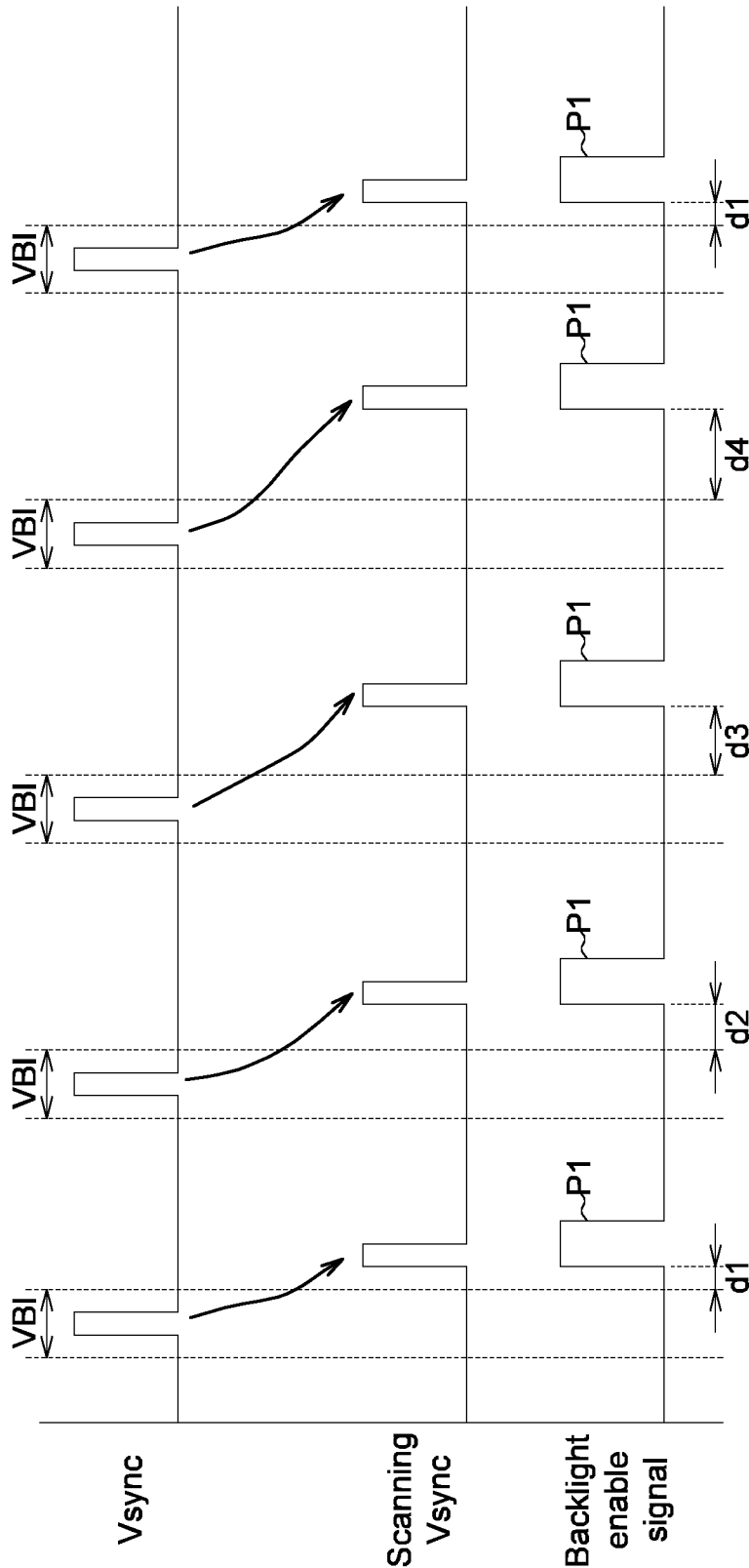
FIG. 5 shows a diagram of the delay interval of the first enable pulse in multiple image frames according to an embodiment of the present invention.

There may be several implementations for generating the backlight enable signal according to the vertical sync pulse. One embodiment is given below. FIG. 5 shows a diagram of the delay interval of the first enable pulse in multiple image frames according to an embodiment of the present invention. In this embodiment, the backlight control circuit 206 delays the vertical sync pulse for a time interval to generate a scanning vertical sync pulse. This time interval may be different in consecutive image frames, such that the start time of the scanning vertical sync pulse may be different in consecutive image frames. Then the backlight control circuit 206 may increase the duration of the scanning vertical sync pulse (enlarge the pulse width) to generate the first enable pulse P1. The reason for including this step of enlarging the pulse width is that the required backlight on time (the time duration that the backlight unit is turned on) in an image frame may be longer than the duration of the vertical sync pulse in a LCD device. Note that the step of generating the backlight enable signal in this embodiment is just exemplary rather than limiting the invention.

As shown in FIG. 5, the delay intervals d1, d2, d3, d4 between the start time of the first enable pulse P1 and the end time of the vertical blanking interval in each frame interval are different. In one embodiment, these delay intervals d1, d2, d3, d4 vary periodically. For example, these delay intervals vary periodically as follows: d1→d2→d3→d4→d1→d2→d3→d4. This approach effectively simplifies the software or hardware design of the backlight control circuit 206. It is noted that one cycle includes four different delay intervals in the example shown in FIG. 5 to simplify the drawing and clearly illustrate the periodic variation. In implementation one cycle may include more different delay intervals. For example, one second may be taken as a cycle length for the periodic change of the delay intervals. With frame rate being 30 frames per second (fps), 30 image frames constitute a cycle. One cycle includes 30 different delay intervals d1-d30. If the panel resolution is 1920×1080 (having 1080 rows), the pulse width of the first enable pulse P1 is approximately corresponding to the data scan time for 36 rows (1080/30=36). Note that the numbers for cycle length, frame rate, panel resolution are merely exemplary. These parameters may be adjusted according to the design requirements and applications.

Figure 6:
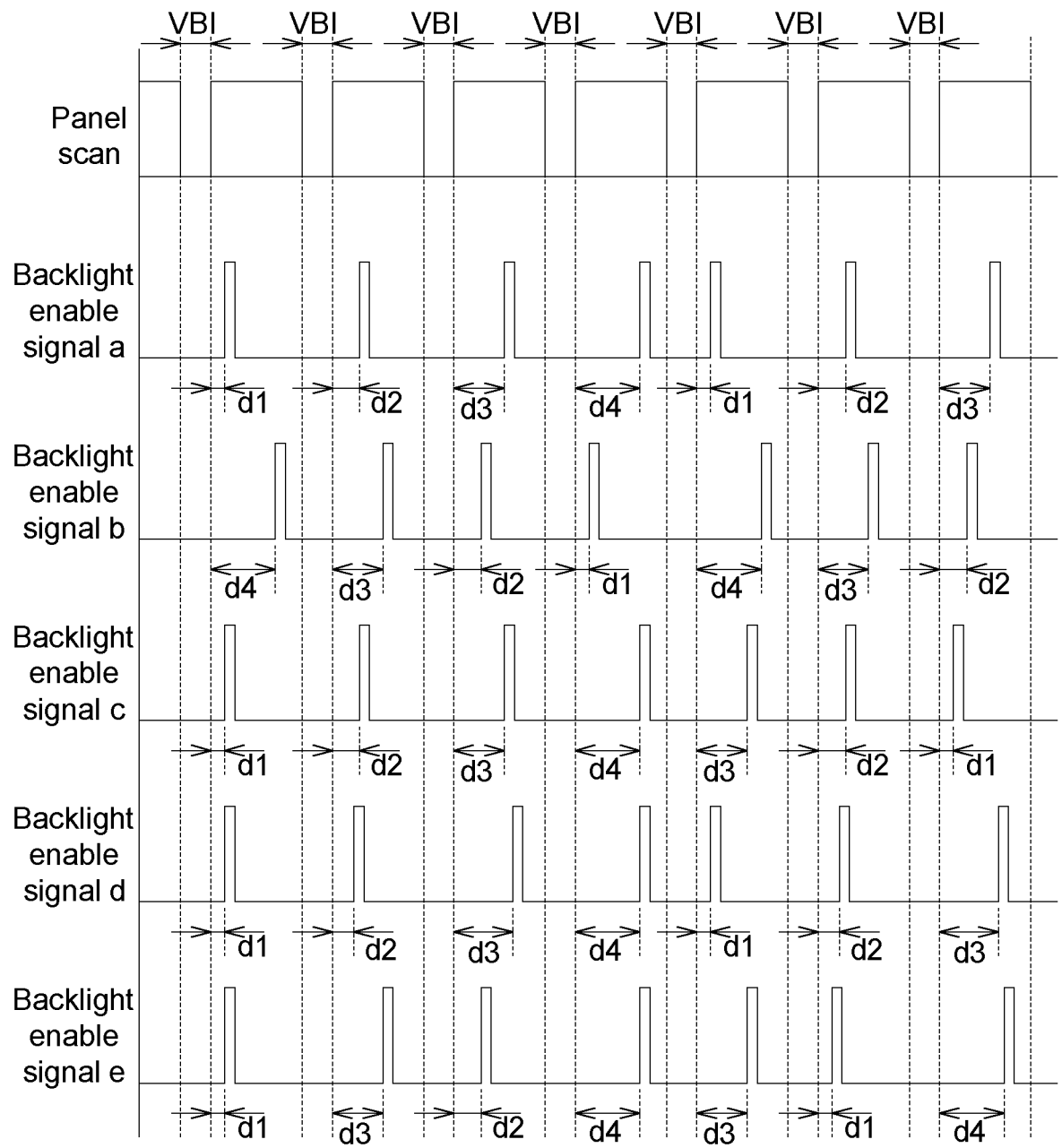
FIG. 6 shows a diagram illustrating variation of the delay interval of the first enable pulse according to an embodiment of the present invention.

There may be several implementations for the variation of the delay intervals d1, d2, d3, d4 of the first enable pulse P1 shown in FIG. 5. FIG. 6 shows a diagram illustrating variation of the delay interval of the first enable pulse P1 according to an embodiment of the present invention. The backlight enable signal a—backlight enable signal e in FIG. 6 represent different implementations. As described above, each backlight signal a-e includes four different delay intervals in FIG. 6 to simplify the drawing. There may be more or fewer delay intervals in real applications. The different delay intervals in FIG. 6 use d1<d2<d3<d4 as an example, where d1 may be zero.

Backlight enable signal a: the delay interval varies periodically, and the delay interval increases periodically in each frame interval. For example: d1→d2→d3→d4→d1→d2→d3→ . . . . In this example, the on time of the backlight unit 202 in different image frames correspond to the row scan time of the display panel 200 from top to bottom sequentially, and going back to top after reaching the bottom. In this implementation the variation of the backlight on time is regular, and there are slight variations between most consecutive image frames.

Backlight enable signal b: the delay interval varies periodically, and the delay interval decreases periodically in each frame interval. For example: d4→d3→d2→d1→d4→d3→d2→ . . . . In this example, the on time of the backlight unit 202 in different image frames correspond to the row scan time of the display panel 200 from bottom to top sequentially, and going back to bottom after reaching the top.

Backlight enable signal c: the delay interval varies periodically, and the delay interval alternately increases and decreases periodically in each frame interval. For example: d1→d2→d3→d4→d3→d2→d1→d2→d3 . . . . In this implementation the variation of the backlight on time is regular, and there are slight variations between all consecutive image frames (such as corresponding to scan time of neighboring rows). This approach reduces the image flickering effect.

Backlight enable signal d: the delay interval is smaller than a lower bound LB or greater than an upper bound UB. The lower bound LB is smaller than the upper bound UB. For example, d1<LB, d2<LB, d3>UB, d4>UB. The delay interval may vary periodically or non-periodically. In this example, the on time of the backlight unit 202 correspond to the row scan time near the top of the display panel 200 or near the bottom of the display panel 200. This approach confines the motion blur effect near the top or the bottom of the display panel 200, which corresponds to a viewing region less concerned by the user no matter in TV, computer monitor, or cellphone applications. Therefore such viewing region is more likely to allow motion blur. On the other hand, the motion blur problem near the center of the image can be effectively improved.

Backlight enable signal e: the delay interval varies randomly. There is no specific rule regarding the change of the delay interval between the start time of the first enable pulse P1 and the end time of the vertical blanking interval. This approach randomly distributes the motion blur effect in different locations in the image.

According to the several implementations shown in FIG. 6, the motion blur effect can be dispersed in different locations in the image by changing the delay interval of the backlight on time. For example, the motion blur is evenly distributed in the image and hence the motion blur effect is reduced. Alternatively, the motion blur effect is confined in certain viewing regions. By adopting these approaches, the user perceives less motion blur effect when viewing the image.

Figure 7A:
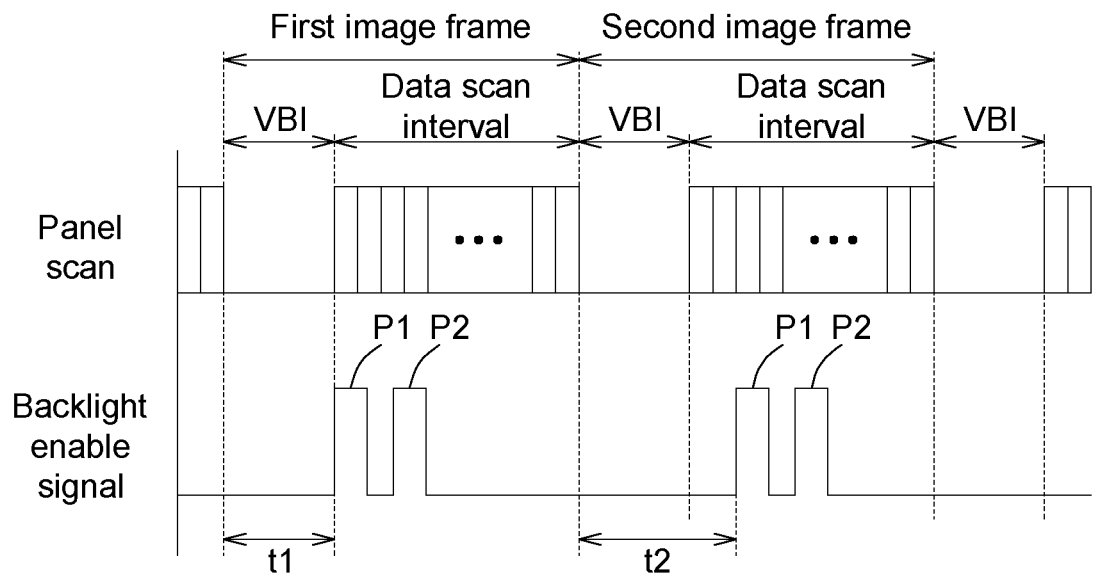
FIG. 7A-FIG. 7C show diagrams illustrating the backlight enable signal including multiple enable pulses according to embodiments of the present invention.
Figure 7B:
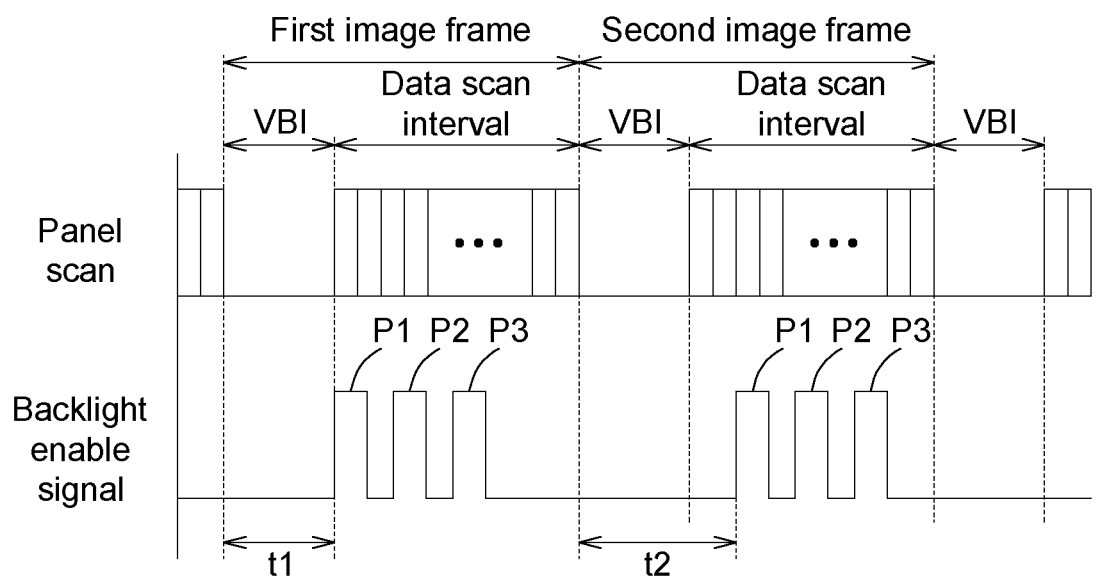
Figure 7C:
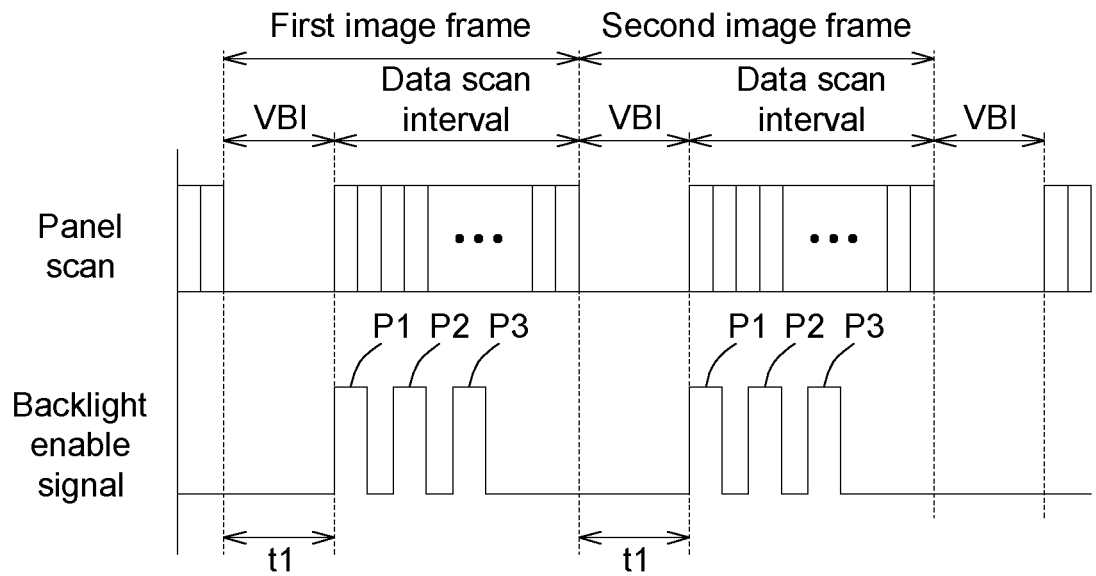

In the method of dynamically adjusting the backlight on time, the backlight enable signal may include multiple enable pulses to further enhance the image brightness. FIG. 7A-FIG. 7C show diagrams illustrating the backlight enable signal including multiple enable pulses according to embodiments of the present invention. As shown in FIG. 7A, the backlight enable signal further includes a second enable pulse P2 in each frame interval. The second enable pulse P2 and the first enable pulse P1 are both in the data scan interval. The backlight unit 202 is turned on during the first enable pulse P1 and the second enable pulse P2. The start time (such as the leading edge) of the second enable pulse P2 is close to and later than the end time (such as the trailing edge) of the first enable pulse P1.

In another embodiment, as shown in FIG. 7B, the backlight enable signal includes the first enable pulse P1, the second enable pulse P2, and the third enable pulse P3 in each frame interval. The third pulse interval P3 is also in the data scan interval. The backlight unit 202 is turned on during the first enable pulse P1, the second enable pulse P2, and the third enable pulse P3. The start time of the third enable pulse P3 is close to and later than the end time of the second enable pulse P2.

In another embodiment, as shown in FIG. 7C, similar to the embodiment shown in FIG. 7B, the backlight enable signal includes the first enable pulse P1, the second enable pulse P2, and the third enable pulse P3 in each frame interval. The start time of the first enable pulse P1 remains the same in each frame interval in the embodiment shown in FIG. 7C. According to the embodiments shown in FIG. 7A-FIG. 7C, the image brightness can be intensified by using multiple enable pulses in the data scan interval. The start time of the multiple enable pulses in each interval may be kept the same. Alternatively, the delay interval of the first enable pulse P1 may be adjusted according to the embodiment shown in FIG. 6.

Figure 8:
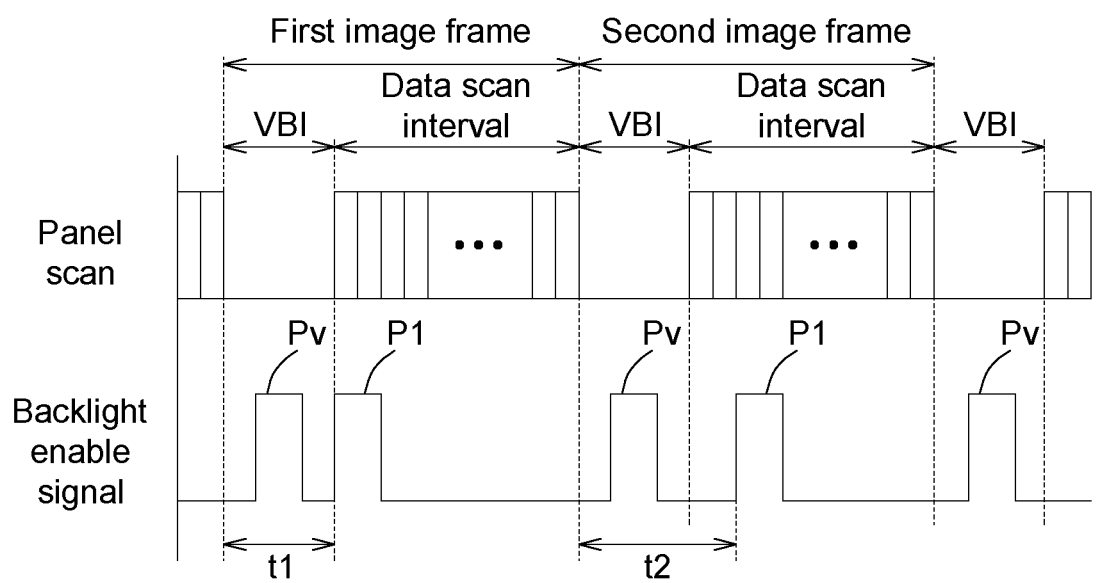
FIG. 8 shows a diagram of the backlight enable signal including a blanking enable pulse according to an embodiment of the present invention.

In one embodiment, the backlight unit 202 may also be turned on in the vertical blanking interval. FIG. 8 shows a diagram of the backlight enable signal including a blanking enable pulse according to an embodiment of the present invention. The backlight enable signal further includes a blanking enable pulse Pv in each frame interval. The blanking enable pulse Pv is in the vertical blanking interval. The backlight unit 202 is turned on during the blanking enable pulse Pv. In this embodiment, the backlight unit is turned on in both the vertical blanking interval and the data scan interval to enhance the image brightness. In other embodiments adopting this approach (turning on the backlight unit in the vertical blanking interval), there may be also more than one enable pulses in the data scan interval, like the examples shown in FIG. 7A and FIG. 7B.

Figure 9:
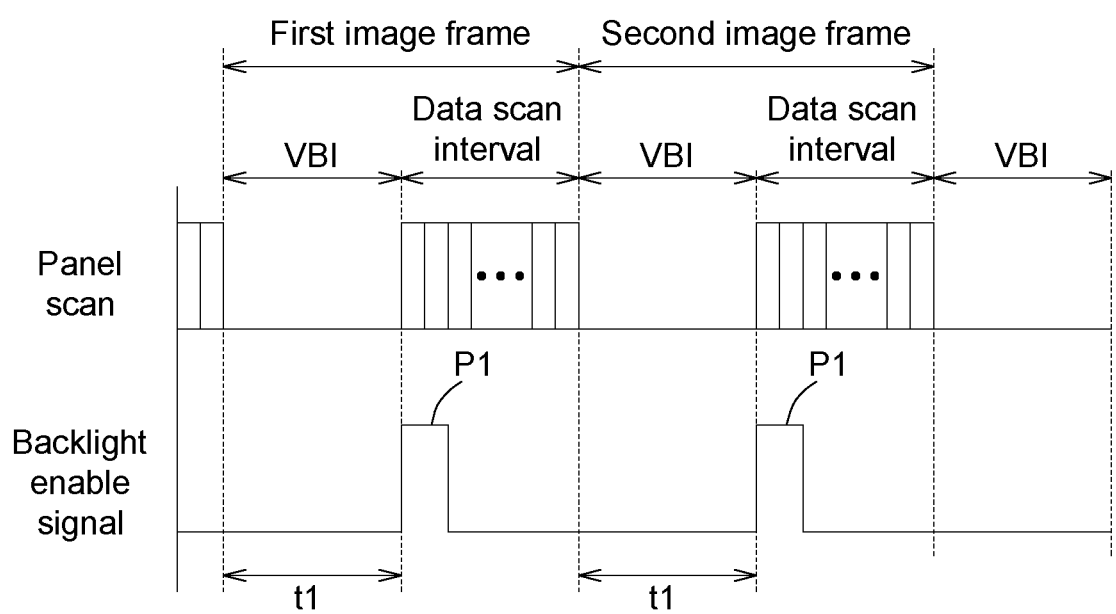
FIG. 9 shows a diagram of adjusting the vertical blanking interval according to an embodiment of the present invention.

In one embodiment, the display driving circuit 204 may adjust a ratio of the vertical blanking interval to the data scan interval in each frame interval to improve the image brightness. For example, in a fixed length of the frame interval, the length of the vertical blanking interval may be increased, thus decreasing the length of the data scan interval. One example may be referred to FIG. 9, which shows a diagram of adjusting the vertical blanking interval according to an embodiment of the present invention. The ratio of the vertical blanking interval to the data scan interval in FIG. 9 is larger than that of the examples shown in FIG. 3-FIG. 8. As such, the backlight on time in the data scan interval is effectively increased even if the pulse width of the first enable pulse P1 remains the same as that in the examples shown in FIG. 3-FIG. 8, effectively improving the image brightness.

It is noted that the ratio of the vertical blanking interval to the data scan interval illustrated in FIG. 3-FIG. 9 might not be the same as the ratio in real applications. The length of the vertical blanking interval is approximately equal to the length of the data scan interval in FIG. 9 to make the drawing clearly illustrate the embodiment. However, the ratio in real design may be adjusted according to the panel characteristics and design requirements. For example, in the embodiment shown in FIG. 3, the ratio of the vertical blanking interval to the data scan interval may be 2%. In the embodiment shown in FIG. 9, the ratio of the vertical blanking interval to the data scan interval may be 20%.

In the embodiment shown in FIG. 9 (adjusting the length of the vertical blanking interval), the start time of the first pulse P1 in each frame interval is the same. In one embodiment, the delay interval of the first pulse P1 may be adjusted, such as the example shown in FIG. 6. In addition, there may be also more than one enable pulses in the data scan interval, such as the examples shown in FIG. 7A and FIG. 7B. The backlight unit 202 may also be turned on in the vertical blanking interval, such as the example shown in FIG. 8. The related method has been described above and thus is not repeated here. The approaches in these embodiments are optional and do not conflict with each other, and thus may be adopted simultaneously.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display method for reducing motion blur, comprising:
   receiving a video signal, the video signal comprising a plurality of frames;
   displaying the plurality of frames sequentially in a plurality of frame intervals on a display panel, wherein each frame interval comprises one vertical blanking interval and a data scan interval;
   providing a backlight enable signal in each frame interval to control turning on and turning off of one backlight unit for the display panel, the backlight enable signal comprising a first enable pulse and a blanking enable pulse, wherein the first enable pulse is in the data scan interval, the blanking enable pulse is in the vertical blanking interval, and the backlight unit is turned on during the first enable pulse and the blanking enable pulse;
   receiving a vertical sync signal, the vertical sync signal comprising a vertical sync pulse in the vertical blanking interval;
   generating the backlight enable signal according to the vertical sync pulse; and
   adjusting a ratio of the vertical blanking interval to the data scan interval in each frame interval.

2. The display method according to claim 1, wherein the ratio of the vertical blanking interval to the data scan interval in each frame interval is increased from 2% to 20%.

3. The display method according to claim 1, wherein a start time of the first enable pulse in each frame interval is the same.

4. The display method according to claim 1, wherein the backlight enable signal further comprises a second enable pulse and a third enable pulse in each frame interval, the second enable pulse and the third enable pulse are in the data scan interval, a start time of the third enable pulse is close to and later than an end time of the second enable pulse.

5. The display method according to claim 1, further comprising:
   adjusting a time length of the first enable pulse.

6. The display method according to claim 1, wherein the plurality of frame intervals correspond to a plurality of cycles, each cycle comprises N frame intervals and N delay intervals, N is an integer larger than 1, each delay interval is between an end time of the corresponding vertical blanking interval and a start time of the corresponding first enable pulse, the N delay intervals comprise a first delay interval to a N-th delay interval, the first delay interval to the N-th delay interval of one of the cycles are substantially the same with the first delay interval to the N-th delay interval of another one of the cycles; and
   wherein the N delay intervals comprise a I-th delay interval and a (I+1)-th delay interval, I is an integer larger than 1 and smaller than N, the (I+1)-th delay interval is greater or smaller than the I-th delay interval.

7. A display method for reducing motion blur, comprising:
   receiving a video signal, the video signal comprising a plurality of frames;
   displaying the plurality of frames sequentially in a plurality of frame intervals on a display panel, wherein each frame interval comprises a vertical blanking interval and a data scan interval;
   providing a backlight enable signal in each frame interval to control turning on and turning off of a backlight unit for the display panel, the backlight enable signal comprising a first enable pulse, wherein the first enable pulse is in the data scan interval, and the backlight unit is turned on during the first enable pulse; and
   adjusting a ratio of the vertical blanking interval to the data scan interval in each frame interval.

8. The display method according to claim 7, wherein the ratio of the vertical blanking interval to the data scan interval in each frame interval is increased from 2% to 20%.

9. The display method according to claim 8, wherein a pulse width of the first enable pulse remains the same, and a backlight on time in the data scan interval is increased.

10. The display method according to claim 7, wherein a start time of the first enable pulse in each frame interval is the same.

11. The display method according to claim 7, wherein the backlight enable signal further comprises a second enable pulse and a third enable pulse in each frame interval, the second enable pulse and the third enable pulse are in the data scan interval, a start time of the third enable pulse is close to and later than an end time of the second enable pulse.

12. The display method according to claim 7, further comprising:
adjusting a time length of the first enable pulse.

13. The display method according to claim 7, wherein the plurality of frame intervals correspond to a plurality of cycles, each cycle comprises N frame intervals and N delay intervals, N is an integer larger than 1, each delay interval is between an end time of the corresponding vertical blanking interval and a start time of the corresponding first enable pulse, the N delay intervals comprise a first delay interval to a N-th delay interval, the first delay interval to the N-th delay interval of one of the cycles are substantially the same with the first delay interval to the N-th delay interval of another one of the cycles; and
wherein the N delay intervals comprise a I-th delay interval and a (I+1)-th delay interval, I is an integer larger than 1 and smaller than N, the (I+1)-th delay interval is greater or smaller than the I-th delay interval.

14. A display device for reducing motion blur, comprising:
a display panel;
one backlight unit;
a display driving circuit, configured to receive a video signal, the video signal comprising a plurality of frames, the display driving circuit being configured to drive the display panel to display the plurality of frames sequentially in a plurality of frame intervals, wherein each frame interval comprises one vertical blanking interval and a data scan interval; and
a backlight control circuit, configured to provide a backlight enable signal in each frame interval to control turning on and turning off of the backlight unit;
wherein the backlight enable signal comprises a first enable pulse and a blanking enable pulse in each frame interval, the first enable pulse is in the data scan interval, the blanking enable pulse is in the vertical blanking interval, and the backlight unit is turned on during the first enable pulse and the blanking enable pulse;
wherein the display driving circuit is configured to provide a vertical sync signal, the vertical sync signal comprising a vertical sync pulse in the vertical blanking interval, the backlight control circuit is configured to generate the backlight enable signal according to the vertical sync pulse; and
wherein the display driving circuit is configured to adjust a ratio of the vertical blanking interval to the data scan interval in each frame interval.

15. The display device according to claim 14, wherein the ratio of the vertical blanking interval to the data scan interval in each frame interval is increased from 2% to 20%.

16. The display device according to claim 15, wherein a pulse width of the first enable pulse remains the same, and a backlight on time in the data scan interval is increased.

17. The display device according to claim 14, wherein a start time of the first enable pulse in each frame interval is the same.

18. The display device according to claim 14, wherein the backlight enable signal further comprises a second enable pulse and a third enable pulse in each frame interval, the second enable pulse and the third enable pulse are in the data scan interval, a start time of the third enable pulse is close to and later than an end time of the second enable pulse.

19. The display device according to claim 14, wherein the backlight control circuit is further configured to adjust a time length of the first enable pulse.

20. The display device according to claim 14, wherein the plurality of frame intervals correspond to a plurality of cycles, each cycle comprises N frame intervals and N delay intervals, N is an integer larger than 1, each delay interval is between an end time of the corresponding vertical blanking interval and a start time of the corresponding first enable pulse, the N delay intervals comprise a first delay interval to a N-th delay interval, the first delay interval to the N-th delay interval of one of the cycles are substantially the same with the first delay interval to the N-th delay interval of another one of the cycles; and
wherein the N delay intervals comprise a I-th delay interval and a (I+1)-th delay interval, I is an integer larger than 1 and smaller than N, the (I+1)-th delay interval is greater or smaller than the I-th delay interval.

* * * * *